No. 745,883. Patented December 1, 1903.

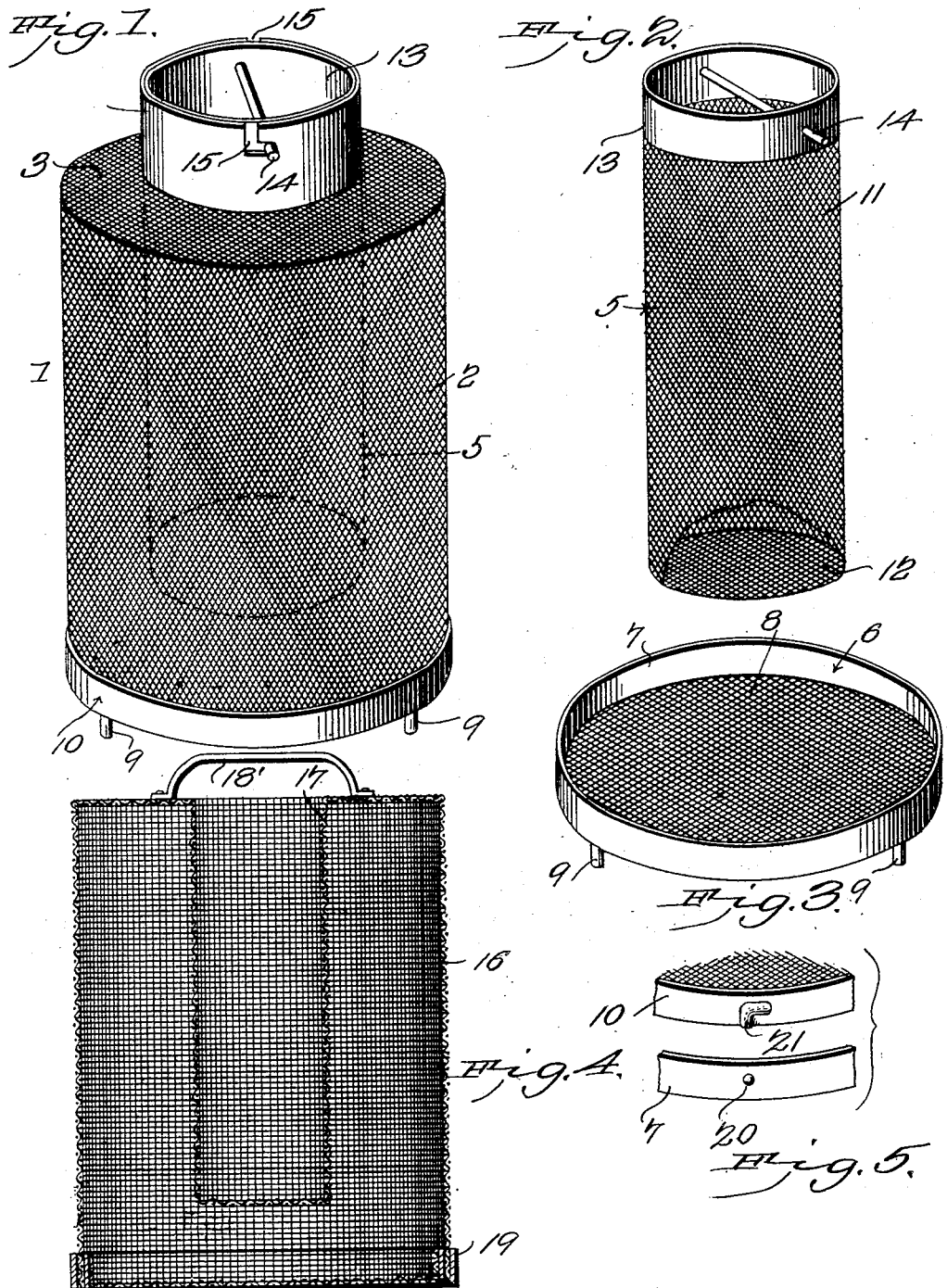

UNITED STATES PATENT OFFICE.

WALTER R. MONTGOMERY, OF SHREVEPORT, LOUISIANA.

PERCOLATOR FOR COFFEE OR TEA POTS.

SPECIFICATION forming part of Letters Patent No. 745,883, dated December 1, 1903.

Application filed March 18, 1902. Serial No. 98,819. (No model.)

*To all whom it may concern:*

Be it known that I, WALTER R. MONTGOMERY, a citizen of the United States, residing at Shreveport, in the parish of Caddo and State of Louisiana, have invented a new and useful Percolator for Coffee or Tea Pots, of which the following is a specification.

This invention relates generally to attachments for coffee-pots, and particularly to a novel form of percolator therefor.

The object of the invention is to provide a percolator which will in a rapid, thorough, simple, and efficient manner and without the formation of grounds or "mud" extract the strength and full flavor from the coffee and one which after the process of percolation has been completed may readily be removed from the coffee-pot or coffee-urn, if desired.

With these and other objects in view, as will appear as the nature of the invention is better understood, the same consists of the novel construction and combination of parts of a coffee-percolator, as will be hereinafter fully described and claimed.

In the accompanying drawings, forming a part of this specification, and in which like numerals of reference indicate corresponding parts, there are illustrated two forms of embodiment of the invention capable of carrying the same into practical operation, it being understood that the elements therein exhibited may be varied or changed as to shape, proportion, and exact manner of assemblage without departing from the spirit thereof, and in these drawings—

Figure 1 is a view in perspective of the percolator with all of the parts positioned therein. Fig. 2 is a perspective detail view of the water distributer or divider. Fig. 3 is a similar view of the bottom detached from the percolator. Fig. 4 is a view in vertical transverse section of a modified form of percolator. Fig. 5 is a detail view of a modified manner of assembling the bottom with the receiver.

As is well known, it is a desideratum in making percolated or so-called "drip" coffee to cause intimate and rapid contact between the boiling water and the coffee in order that the full strength and flavor thereof may be extracted. The percolators commonly and, in fact, almost universally employed are in the nature of a casing or bag into which the charge of coffee is placed and upon which is poured the boiling water. Owing to the fact that the finely-ground coffee packs or masses as soon as it becomes saturated, the full strength of the coffee contained in the center of the mass cannot be extracted, and in order that the coffee shall have the desired strength a greater quantity has to be employed than would be necessary if all of the ground coffee were equally acted upon by the hot water. By the percolator hereinafter described the above desideratum is secured by dividing the charge of coffee in such manner as to cause it to present a tubular column and by causing the water to pass from the inner to the outer walls thereof, thereby causing the coffee at the center of the receiver or holder to be acted upon by the hot water in the same manner as that on the outer side thereof.

In carrying the invention in effect there is provided a coffee holder or receiver 1, comprising a body portion 2 and a top or shoulder 3, both parts being made of a suitable reticulated or foraminous metal, and associated with the top is a neck 4, which operates as a supporting means for the water distributer or divider 5, the neck being by preference made of a piece of sheet metal, such as tin or the like. The lower end of the receiver or holder is closed by a bottom 6, comprising a band or flange 7, having associated with it a reticulated or foraminous disk 8, constituting the bottom proper, the said band or bottom, if preferred, having associated with it suitable legs 9, by which the structure will be supported above the bottom of a coffee pot or urn when in use. The bottom portion of the receiver or holder has associated with it a band 10, adapted to reinforce the holder at that point and to constitute a bearing for the band 7, the coaction between the two bands to be such as to prevent escape of coffee-grounds between their points of juncture, and thereby obviate any tendency of the production of muddy coffee.

The water distributer or divider 5 comprises a body portion 11 and a bottom 12 of any suitable reticulated or foraminous metal and has associated with its open top or neck portion a band 13, through which passes a bar 14, the terminals of which project beyond the band and are adapted to engage in bayonet-slots 15 in the neck 4, and thereby lock the distributer in position with relation to the holder, the intermediate portion of the bar serving as a bail by which the distributer, and with it the holder, may be lifted out of the coffee pot or urn when desired. The means for connecting the distributer to the neck of the holder—namely, the bar and the bayonet-slots—is exhibitive merely of one form of device that may be employed for the purpose and as it will be obvious that other means may be employed for the same purpose, detailed illustration of other means for carrying out this part of the invention is deemed unnecessary.

As shown in the form of embodiment of the invention illustrated in the figures just described, the percolator comprises three separate parts; but, if preferred, it may be made only of two parts—namely, a receiver and distributer in one part and a bottom in another part—and the manner of carrying this modified construction into effect is shown in Fig. 4, wherein the body 16 and distributer 17 are formed of a single sheet of reticulated or foraminous metal stamped or otherwise formed to the appropriate shape and having associated with it a bottom 18, constructed in the same manner as that shown in Fig. 3. When this latter form of percolator is employed, it will have a bail 18' associated with its upper portion in any preferred manner and also a band 19 around its bottom for the same purpose as the band 10 of the holder 1.

In using the device in the case of the construction shown in Figs. 1 to 3 the distributer is positioned as shown in Fig. 1, and the bottom is removed and the coffee poured into the holder around the distributer, after which the bottom is placed in position and the structure set within the urn or coffee-pot upon its legs. Boiling water is then poured into the neck or band portion of the distributer and passes out through the contained coffee and escapes through the holder. As the water rises in the coffee pot or urn it will enter through the holder at its sides and bottom, and thus supplement the water escaping from the distributer and extracting the full strength of the coffee. When the percolating process is completed, the percolator may be removed from its containing-receptacle by grasping the bar 14.

The operation is the same where the percolator shown in Fig. 4 is employed, the only difference being that its distributer is always in position.

Instead of having the bottom of the holder held in engagement therewith by frictional contact with the inner walls thereof it may engage the outer walls thereof, or, as shown in Fig. 5, the band 7 may be provided with outward-projecting oppositely-disposed pintles 20 to engage bayonet-grooves 21, formed in the band 10, or, if preferred, this arrangement may be transposed—that is to say, the band 10 may be provided with the pintles 20 and the band 7 with the bayonet-grooves, in which case the band 7 would fit on the outside of the band 10. These modifications will be readily understood, and detailed illustration is deemed unnecessary.

It will be seen from the foregoing description that although the device of this invention is exceedingly simple in construction it will be thoroughly efficient for the purpose designed and it may be relied upon for doing the work for which it is designed.

Having thus fully described my invention, what I claim as new, and desire to secure by Letters Patent, is—

A utensil of the character described comprising an outer receiver having a top and an open-work removable bottom and open-work sides, and an inner open-work distributer depending from the top of the receiver and terminating short of the bottom of the same, the top of the receiver having an orifice communicating with the distributer.

In testimony that I claim the foregoing as my own I have hereto affixed my signature in the presence of two witnesses.

WALTER R. MONTGOMERY.

Witnesses:
FRANK S. APPLEMAN,
R. M. ELLIOTT.